(12) United States Patent
Cho et al.

(10) Patent No.: US 8,145,224 B2
(45) Date of Patent: Mar. 27, 2012

(54) METHOD AND SYSTEM FOR TRANSMITTING AND RECEIVING COMMON CONTROL INFORMATION IN A COMMUNICATION SYSTEM

(75) Inventors: Ki-Chun Cho, Suwon-si (KR); Mi-Hyun Lee, Seoul (KR); Jae-Weon Cho, Suwon-si (KR); Ho-Kyu Choi, Seongnam-si (KR); Hyun-Kyu Yu, Seoul (KR); Chi-Woo Lim, Suwon-si (KR); Song-Nam Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1037 days.

(21) Appl. No.: 12/075,188

(22) Filed: Mar. 10, 2008

(65) Prior Publication Data

US 2008/0220791 A1    Sep. 11, 2008

(30) Foreign Application Priority Data

Mar. 9, 2007  (KR) ................. 10-2007-0023520
Nov. 16, 2007  (KR) ................. 10-2007-0117450

(51) Int. Cl.
*H04W 72/00*  (2009.01)
*H04W 4/00*  (2009.01)
(52) U.S. Cl. ......... 455/450; 455/448; 370/328; 370/329
(58) Field of Classification Search ............... 455/450
See application file for complete search history.

(56) References Cited

U.S. PATENT DOCUMENTS

| 6,970,713 | B2 | 11/2005 | Roy et al. |
| 2004/0133624 | A1 | 7/2004 | Park |
| 2005/0107036 | A1* | 5/2005 | Song et al. ............ 455/23 |
| 2007/0293234 | A1 | 12/2007 | Kim et al. |

FOREIGN PATENT DOCUMENTS

| KR | 100250991 | * | 1/2000 |
| KR | 100250991 | B1 | 1/2000 |
| KR | 1020040063238 | A | 7/2004 |
| KR | 1020070119179 | A | 12/2007 |
| KR | 1020080078194 | A | 8/2008 |
| WO | WO 01/08438 | A1 | 2/2001 |
| WO | WO 2005/050875 | A1 | 6/2005 |

OTHER PUBLICATIONS

Written Opinion of the International Searching Authority dated Jun. 24, 2008 in connection with PCT Application No. PCT/KR2008/001347.

* cited by examiner

*Primary Examiner* — Patrick Edouard
*Assistant Examiner* — Huy C Ho

(57) ABSTRACT

Disclosed is a method of transmitting common control information by a base station in a communication system including a first communication system and a second communication system different from each other. In the communication system, a frame for carrying the common control information includes an uplink sub-frame and a downlink sub-frame, each of which includes a resource allocation area for the first communication system and a resource allocation area for the second communication system. The method includes: configuring the common control information to be received by a mobile station belonging to the second communication system; and transmitting the common control information through the resource allocation area for the second communication system included in one of the uplink sub-frame and the downlink sub-frame.

20 Claims, 9 Drawing Sheets

METHOD AND SYSTEM FOR TRANSMITTING AND RECEIVING COMMON CONTROL INFORMATION IN A COMMUNICATION SYSTEM

CROSS-REFERENCE TO RELATED APPLICATION(S) AND CLAIM OF PRIORITY

This application claims the benefit under 35 U.S.C. §119(a) of a Korean Patent Application filed in the Korean Intellectual Property Office on Mar. 9, 2007 and assigned Serial No. 2007-23520, and a Korean Patent Application filed in the Korean Intellectual Property Office on Nov. 16, 2007 and assigned Serial No. 2007-117450, the entire disclosure of both of which are hereby incorporated by reference.

TECHNICAL FIELD OF THE INVENTION

The present invention relates to a communication system, and more particularly to a method and a system for transmitting and receiving common control information in a communication system.

BACKGROUND OF THE INVENTION

Recently, mobile communication systems have been developing toward systems capable of providing various services, such as a broadcasting service, a multimedia image providing service, a multimedia message providing service, and the like. Particularly, 4th Generation (4G) mobile communication systems are being developed in order to support a data transmission speed of at least 100 Mbps for a user moving at high speed, and to provide a data service with a capacity of at least 1 Gbps for a user moving at low speed, beyond providing a service mainly for voice and packet data communication.

Systems adjacent to the 4G mobile communication systems include a portable Internet system, which is also called a Mobile WiMAX communication system and is compatible with a communication system based on Institute of Electrical and Electronics Engineers (IEEE) 802.16 standards.

The Mobile WiMAX communication system is in a stage of being commercialized, and a Mobile WiMAX evolution communication system developed from the Mobile WiMAX communication system is now being researched.

The research for the Mobile WiMAX evolution communication system pursues satisfying a short latency for link adaptation in preparation for a fast moving speed of a mobile station and to support a Hybrid Automatic Repeat reQuest (HARQ) for a real time service.

The Mobile WiMAX communication system and the Mobile WiMAX evolution communication system as described above can coexist. However, the Mobile WiMAX communication system and the Mobile WiMAX evolution communication system may have different sub-channel structures or different signaling systems. Accordingly, it is necessary to define various solutions for the case in which the Mobile WiMAX communication system and the Mobile WiMAX evolution communication system coexist.

SUMMARY OF THE INVENTION

To address the above-discussed deficiencies of the prior art, it is a primary object of the present invention to solve the above-mentioned problems occurring in the prior art, and the present invention provides a method and a system for transmitting and receiving common control information in a communication system.

In accordance with an aspect of the present invention, there is provided a method of transmitting common control information by a base station in a communication system including a first communication system and a second communication system different from each other, wherein a frame for carrying the common control information includes an uplink sub-frame and a downlink sub-frame, each of which includes a resource allocation area for the first communication system and a resource allocation area for the second communication system, the method including the steps of: configuring the common control information to be received by a mobile station belonging to the second communication system; and transmitting the common control information through the resource allocation area for the second communication system included in one of the uplink sub-frame and the downlink sub-frame.

In accordance with another aspect of the present invention, there is provided a method of receiving common control information by a mobile station in a communication system including a first communication system and a second communication system different from each other, wherein a frame for carrying the common control information includes an uplink sub-frame and a downlink sub-frame, each of which includes a resource allocation area for the first communication system and a resource allocation area for the second communication system, the method including the steps of: receiving the common control information for the second communication system, which is transmitted through the resource allocation area for the second communication system from the base station; decoding the common control information; and detecting a resource allocation area for the second communication system in a next downlink sub-frame through the decoding.

In accordance with another aspect of the present invention, there is provided a communication system including a first communication system and a second communication system different from each other, wherein a frame for carrying the common control information includes an uplink sub-frame and a downlink sub-frame, each of which includes a resource allocation area for the first communication system and a resource allocation area for the second communication system, the communication system including: a base station for configuring the common control information to be received by a mobile station belonging to the second communication system, and transmitting the common control information through the resource allocation area for the second communication system included in one of the uplink sub-frame and the downlink sub-frame; and the mobile station, which belongs to the second communication system, for receiving the common control information for the second communication system, which is transmitted through the resource allocation area for the second communication system from the base station, decoding the common control information, and identifying a resource allocation area for the second communication system in a next downlink sub-frame through the decoding.

In accordance with another aspect of the present invention, there is provided a method of transmitting common control information by a second base station of a second cell in a communication system including a first cell operated by a first communication system different from the second communication system and the second cell operated by both the first communication system and the second communication system, wherein each of frames differently used in the first cell and the second cell includes an uplink sub-frame and a downlink sub-frame, each of the uplink sub-frame and the downlink sub-frame of each frame used in the second cell includes a resource allocation area for the first communication system and a resource allocation area for the second communication system, the method including the steps of: configuring the common control information to be received by a mobile station belonging to the second communication system; transmitting the common control information in a time interval before a time interval for transmitting a reference signal in a downlink sub-frame of the second cell; and preventing a mobile station belonging to the first communication system of the first cell from transmitting an uplink signal during the time interval in which the common control information is transmitted.

In accordance with another aspect of the present invention, there is provided a method of receiving common control information by a mobile station belonging to a second communication system of a second cell in a communication system including a first cell operated by a first communication system different from the second communication system and the second cell operated by both the first communication system and the second communication system, wherein each of frames differently used in the first cell and the second cell includes an uplink sub-frame and a downlink sub-frame, each of the uplink sub-frame and the downlink sub-frame of each frame used in the second cell includes a resource allocation area for the first communication system and a resource allocation area for the second communication system, the method including the steps of: receiving the common control information during a time interval before a time interval for transmitting a reference signal in a downlink sub-frame of the second cell; decoding the common control information; and detecting a resource allocation area for the second communication system in a next downlink sub-frame through the decoding.

In accordance with another aspect of the present invention, there is provided a method of receiving common control information by a mobile station belonging to a second communication system of a second cell in a communication system including a first cell operated by a first communication system different from the second communication system and the second cell operated by both the first communication system and the second communication system, wherein each of frames differently used in the first cell and the second cell includes an uplink sub-frame and a downlink sub-frame, each of the uplink sub-frame and the downlink sub-frame of each frame used in the second cell includes a resource allocation area for the first communication system and a resource allocation area for the second communication system, the method including the steps of: receiving map information including information on a resource allocation area for the second communication system; detecting the resource allocation area for the second communication system in a current downlink sub-frame through the map information; decoding common control information included in the detected resource allocation area; and detecting a resource allocation area for the second communication system in a next downlink sub-frame through the decoding of the common control information.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

Figure 1:
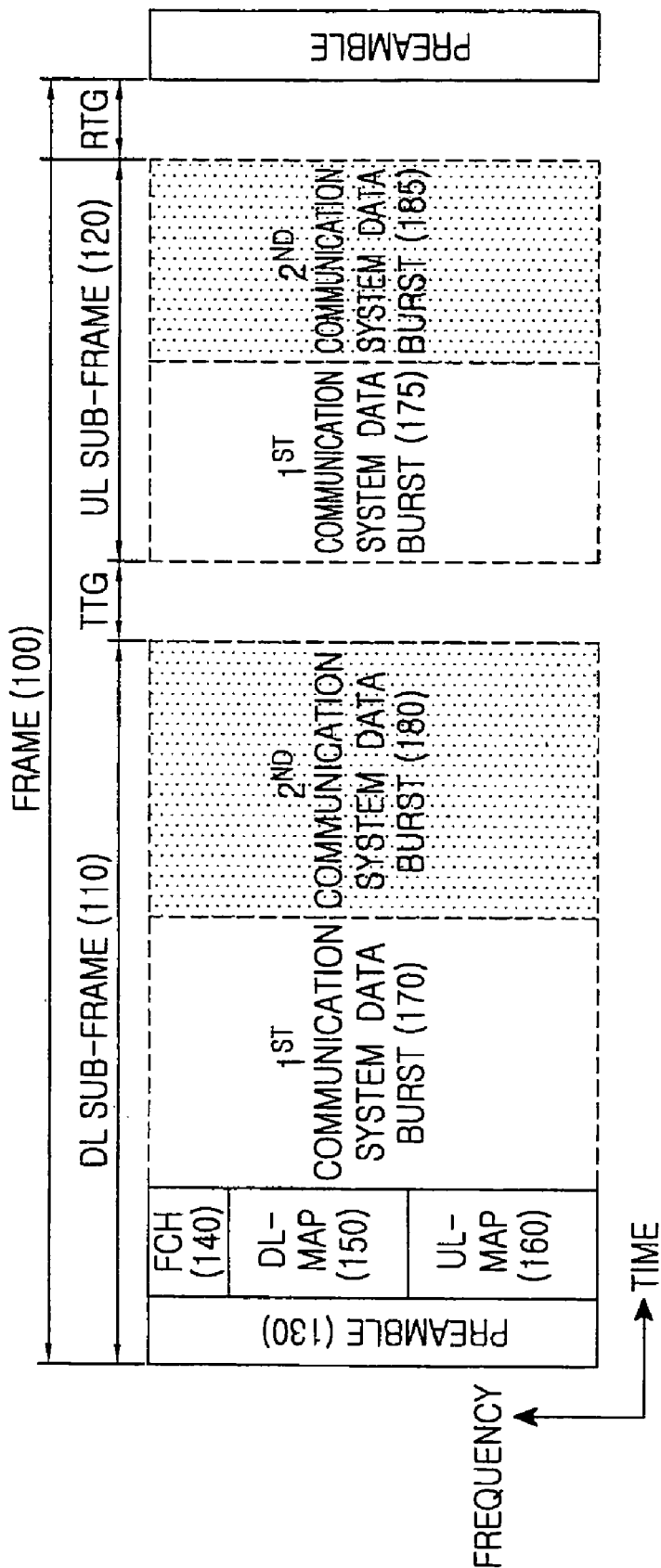
FIG. 1 illustrates a new frame structure for a coexistence mode according to an embodiment of the present invention.

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system.

The present invention proposes a method and a system for transmitting and receiving common control information in a communication system having both a legacy-only mode, in which only a legacy communication system exists, and a coexistence mode, in which a legacy communication system and an evolved communication system evolved from the legacy communication system coexist. To this end, the present invention proposes a new frame structure and a scenario for providing common control information in a new frame. As used herein, the common control information includes cell information or system information that all mobile stations must receive, and the cell information and system information refer to information necessary for basic operation of a corresponding mobile station after the mobile station acquires synchronization.

In the following description of embodiments of the present invention, a legacy communication system will be called a first communication system, and an evolved communication system will be called a second communication system. The first communication system may be, for example, a Mobile WiMAX communication system, that is, an IEEE 802.16e communication system. The second communication system may be, for example, a Mobile WiMAX evolution communication system, that is, an IEEE 802.16m communication system. The second communication system not only satisfies all particulars defining the first communication system, but also satisfies particulars defining an evolved system in comparison with the first communication system.

In the following description, a mobile station compatible with only the first communication system is called a first communication system mobile station, and a mobile station compatible with both the first communication system and the second communication system is called a second communication system mobile station.

The first communication system mobile station either may exist and receive a service in a cell operated in a legacy-only mode or may exist in a cell operated in a coexistence mode while receiving only a service provided by the first communication system. Further, although the second communication system mobile station can exist in a cell operated in a legacy-only mode, the second communication system mobile station cannot receive a service provided by the second communication system and can receive only a service provided by the first communication system. That is, a second communication system mobile station located in a cell operated in a coexistence mode can receive a service provided by the first communication system as well as a service provided by the second communication system, although it belongs to the second communication system.

Meanwhile, a method and a system for transmitting and receiving common control information proposed by the present invention can be equally applied to other communication systems, such as systems based on Code Division Multiple Access (CDMA), Wideband Code Division Multiple Access (WCDMA), or Global System for Mobile communications (GSM).

Hereinafter, a frame structure for a communication system according to an embodiment of the present invention will be described with reference to FIG. 1.

FIG. 1 illustrates a new frame structure for a coexistence mode according to an embodiment of the present invention.

Referring to FIG. 1, a frame 100 includes a downlink (DL) sub-frame 110 and an uplink (UL) sub-frame 120, each of which includes areas for the first communication system and the second communication system. Each of the areas for the first communication system and the second communication system corresponds to an area including control information or broadcast information or an area including a data burst.

The downlink sub-frame 110 is divided through Time Division Duplexing (TDD) into a preamble area 130, a Frame Control Header (FCH) area 140, a downlink MAP (DL-MAP) area 150, an uplink MAP (UL-MAP) area 160, a first communication system data burst area 170 to which a data burst of the first communication system is allocated, and a second communication system data burst area 180 to which a data burst of the second communication system is allocated.

Meanwhile, the uplink sub-frame 120 is also divided through TDD into a first communication system data burst area 175 and a second communication system data burst area 185.

Although FIG. 1 shows TDD of the downlink sub-frame 110 and the uplink sub-frame 120, the two sub-frames may be multiplexed according to different multiplexing schemes. For example, in the case of the frame shown in FIG. 5, a downlink sub-frame is time division multiplexed, while an uplink sub-frame is both time division multiplexed and frequency division multiplexed.

The preamble area 130 carries a preamble signal used for identification of a base station and synchronization acquisition of mobile stations belonging to the first communication system and the second communication system. That is, the preamble area 130 transmits a preamble signal commonly used in the first communication system and the second communication system. Each of the mobile stations belonging to the first communication system obtains frame structure and operation information by decoding the FCH and MAP message. For robust transmission, a coding rate of 1/12 to 1/16 is applied to a control message, such as the FCH and MAP message.

Meanwhile, each of the mobile stations belonging to the second communication system can acquire synchronization by receiving a preamble signal transmitted through the preamble 130, and can obtain frame structure and operation information by decoding the FCH and MAP message.

As noted from the above description, the frame 100 has a frame structure in which both the first communication system and the second communication system coexist. Further, the FCH area and MAP message areas in FIG. 1 may employ, for example, a Quadrature Phase Shift Keying (QPSK) modulation scheme and a coding rate of 1/12 to 1/16.

Meanwhile, in a frame structure in which the first communication system and the second communication system coexist, the first communication system and the second communication system should be independently operated. That is to say, the second communication system is required to be capable of providing a service of an improved performance in comparison with the first communication system. To this end, a frame structure of a communication system according to an embodiment of the present invention has an additional area including common control information, which will be described with reference to FIG. 2. It should be noted that the frame structure according to an embodiment of the present invention described below refers to a frame structure used in a coexistence mode as long as a separate description is not given.

Figure 2:
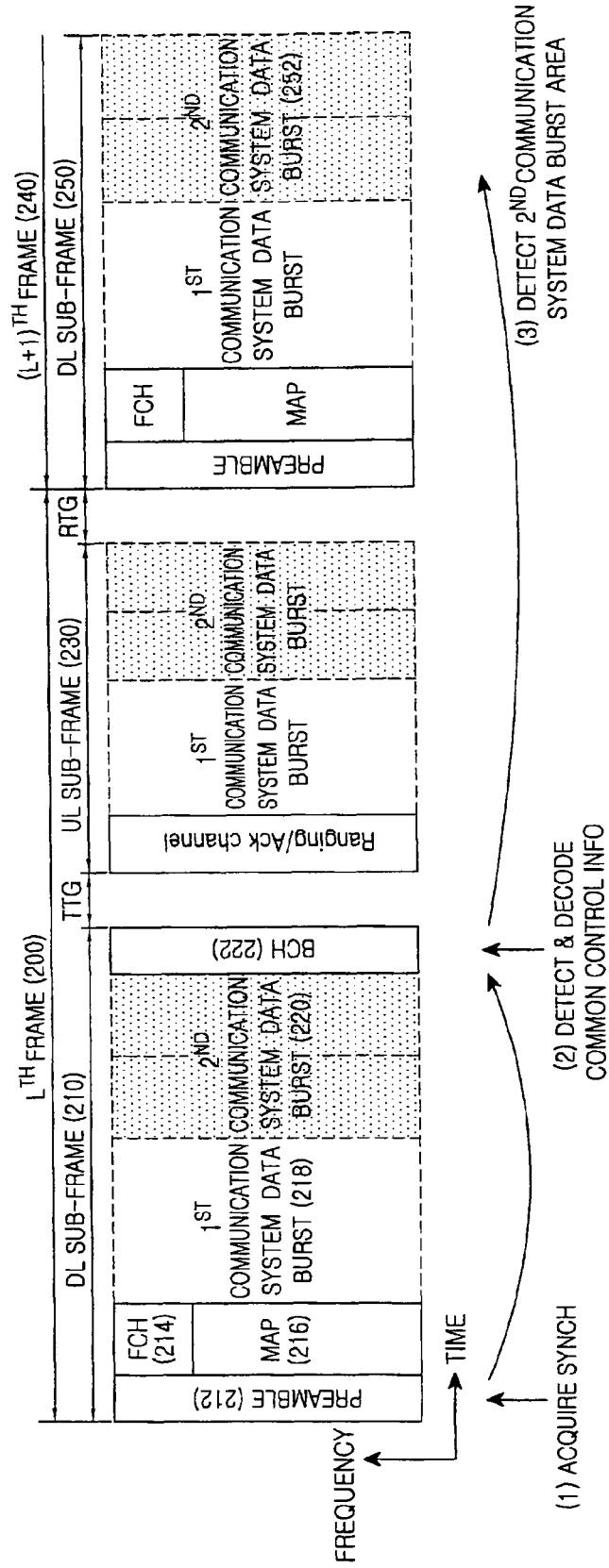
FIG. 2 illustrates a frame structure including an area for common control information in a communication system according to an embodiment of the present invention.

FIG. 2 illustrates a frame structure including an area for common control information in a communication system according to an embodiment of the present invention.

Referring to FIG. 2, an $L^{th}$ frame 200 includes a downlink sub-frame 210 and an uplink sub-frame 230.

The downlink sub-frame 210 includes a preamble area 212, an FCH area 214, a MAP area 216, a first communication system data burst area 218, a second communication system data burst area 220, and a broadcast channel (BCH) area 222.

The preamble area 212 carries a preamble signal used for identification of a base station and acquisition of synchronization. That is, the preamble area 212 corresponds to an area for transmitting a preamble commonly used by the first communication system and the second communication system. The FCH area 214 transmits a frame control header, which includes information on the length of the MAP area 216 and information on the modulation and coding scheme applied to the MAP area 216.

The MAP area 216 transmits a MAP message, which includes information on the modulation and coding scheme, information on locations of the uplink burst area and the downlink burst area, etc.

Meanwhile, a mobile station belonging to the second communication system acquires synchronization by receiving a preamble signal, and obtains common control information by decoding a signal transmitted through the BCH area 222 including the common control information.

The BCH area 222 may be located at a predetermined position in the downlink sub-frame 210. For example, in the frame structures shown in FIGS. 2 and 3, the BCH area is located at the rearmost position in the downlink sub-frame 210. Further, the BCH area 222 may be included in the frame at each period, and the mobile station belonging to the second communication system acquires information related to the second communication system data burst area 252 of the $(L+1)^{th}$ frame 240, which is the next frame, by using the obtained common control information.

Figure 3:
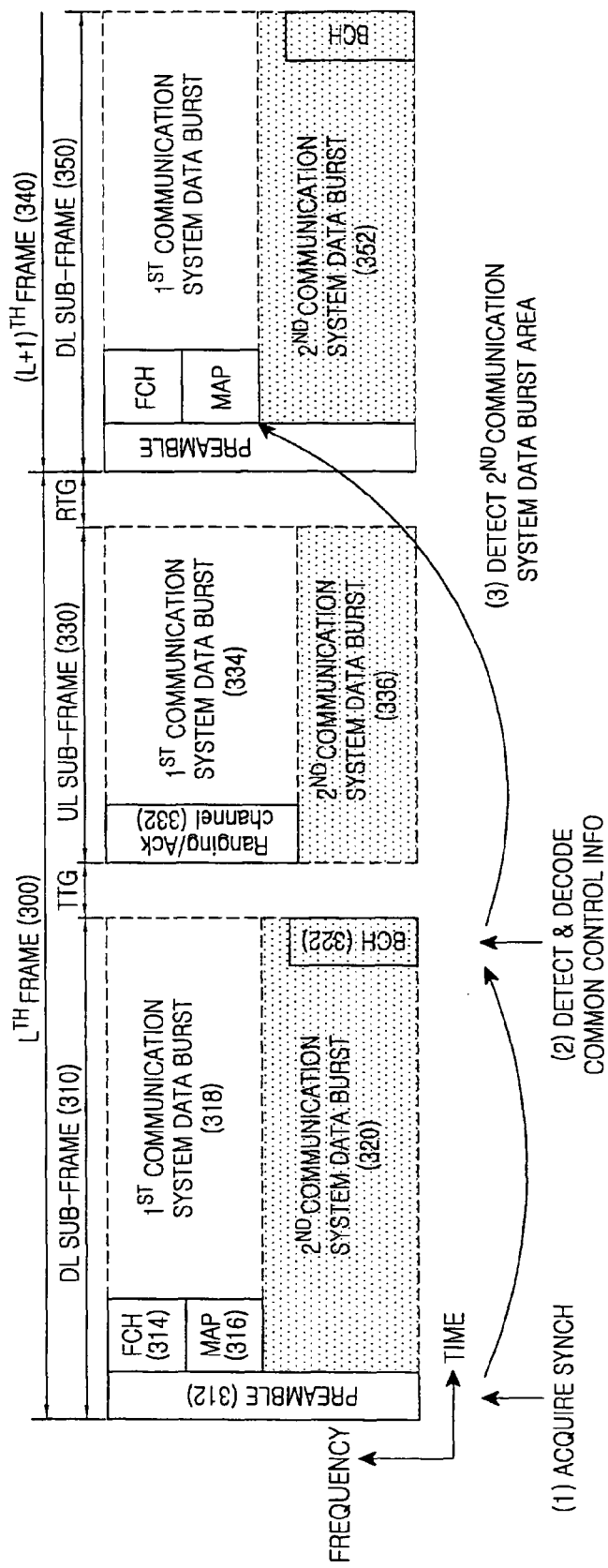
FIG. 3 illustrates a frame structure including a BCH area according to an embodiment of the present invention.

FIG. 3 illustrates a frame structure including a BCH area according to an embodiment of the present invention.

Referring to FIG. 3, an $L^{th}$ frame 300 includes a downlink sub-frame 310 and an uplink sub-frame 330.

The downlink sub-frame 310 includes a preamble area 312, an FCH area 314, a MAP area 316, a first communication system data burst area 318, a second communication system data burst area 320, and a BCH area 322. Further, the uplink sub-frame 330 includes a ranging/ACK channel 332, a first communication system data burst area 334, and a second communication system data burst area 336.

Differently from the frame shown in FIG. 2, data burst areas for the first communication system and the second communication system are frequency division multiplexed in the downlink sub-frame 310 and the uplink sub-frame 330 of the frame shown in FIG. 3. As a result, the BCH area 322 is located at a predetermined position within the second communication system data burst area 320. The BCH area 322 of the $L^{th}$ frame 300 indicates the position of the second communication system data burst area 352 included in the downlink sub-frame 350 of the $(L+1)^{th}$ frame 340.

Figure 4:
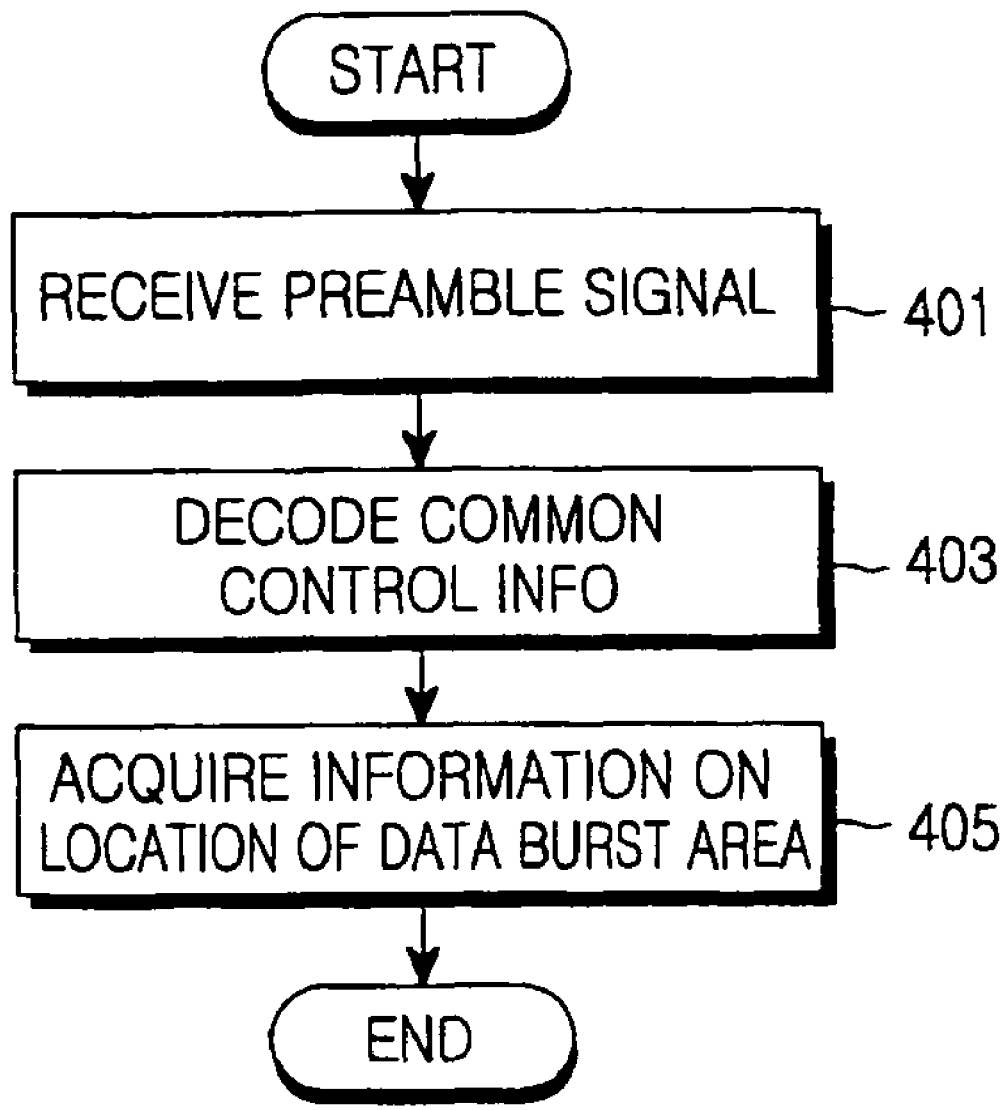
FIG. 4 is a flow diagram illustrating a process of acquiring a downlink data burst area position by a mobile station in a communication system according to an embodiment of the present invention.

FIG. 4 is a flow diagram illustrating a process of acquiring a downlink data burst area position by a mobile station in a communication system according to an embodiment of the present invention.

Referring to FIG. 4, first, the mobile station receives a preamble and acquires synchronization in step 401. Then, in step 403, the mobile station decodes common control information included in the BCH area. Then, in step 405, based on a result of the decoding of the common control information, the mobile station obtains information on the location of the second communication system data burst area included in the downlink sub-frame of the next frame.

Meanwhile, the common control information requires application of a coding rate corresponding to a level of 1/60, which is more robust than that for the control message of the first communication system. Such a low coding rate of 1/60 is required because the common control information is used in a cell coverage of the second communication system, which is wider than the cell coverage of the first communication system, and should be successfully received by a mobile station even at a low Signal to Noise Ratio (SNR) of about −7 dB. However, application of a low coding rate is inefficient in the aspect of resource utilization. For example, if it is assumed that a typical data burst is transmitted with a coding rate of ½ according to a 16 Quadrature Amplitude Modulation (QAM) scheme, common control information transmitted with a coding rate of 1/60 according to a Quadrature Phase Shift Keying (QPSK) scheme requires 60 times as many resources as the resources required for transmission of the typical data burst.

Meanwhile, methods for providing the common control information to a mobile station in a robust and reliable manner include a method of lowering the coding rate through repeated transmission and a method of securing the reliability of signal decoding by improving the channel estimation capability.

A base station transmits a preamble signal at each frame, and a mobile station acquires either synchronization or information on the corresponding base station by receiving the preamble signal. The preamble signal may be used as a reference signal for decoding of other signals, and it is possible to increase the reliability in transmission of the common control information by locating the transmitted preamble area and BCH area adjacent to each other. As used herein, the preamble signal is a signal used in the first communication system, and it is required that a MAP area carrying a MAP message for the first communication system should be located after a preamble area carrying the preamble signal. Therefore, the BCH area can be located before the preamble area. Further, the BCH area can be included in a frame corresponding to a predetermined period.

Hereinafter, a method of transmitting and receiving common control information according to another embodiment of the present invention will be described, wherein a BCH area is located before a preamble area in order to reliably provide the common control information to a mobile station.

Figure 5:
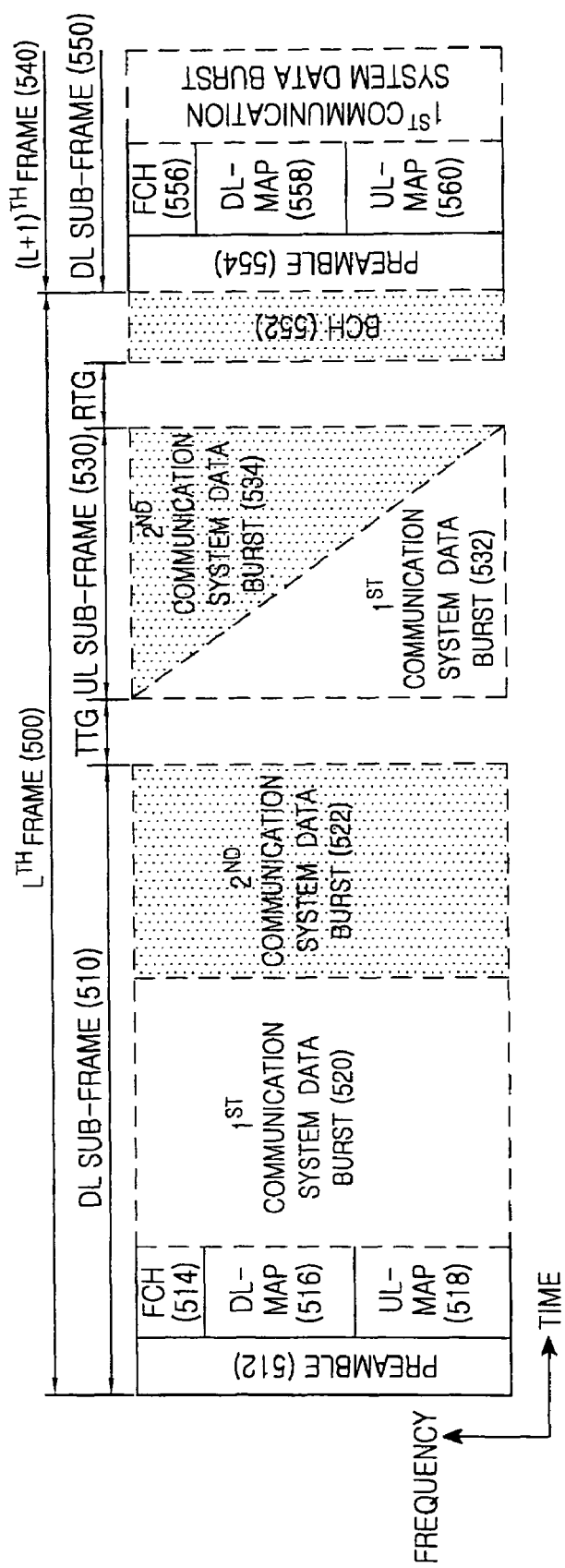
FIG. 5 illustrates a frame structure including a BCH area according to another embodiment of the present invention.

FIG. 5 illustrates a frame structure including a BCH area according to another embodiment of the present invention.

Referring to FIG. 5, in the $L^{th}$ frame 500, the downlink sub-frame 510 has been time division multiplexed and the uplink sub-frame 530 has been either time division multiplexed, frequency division multiplexed, or Orthogonal Frequency Division Multiplexed. However, each of the downlink sub-frame 510 and the uplink sub-frame 530 may employ at least one scheme from among a time division multiplexing (TDM) scheme, a frequency division multiplexing (FDM) scheme, an Orthogonal Frequency Division Multiplexing (OFDM) scheme, a combination scheme including both the TDM scheme and the FDM scheme, and a combination scheme including all of the TDM scheme, the FDM scheme, and the OFDM scheme.

In the $L^{th}$ frame 500, the downlink sub-frame 510 includes a preamble area 512, an FCH area 514, a DL-MAP area 516, a UL-MAP area 518, a first communication system data burst area 520, and a second communication system data burst area 522. Further, in the $L^{th}$ frame 500, the uplink sub-frame 530 includes a first communication system data burst area 532 and a second communication system data burst area 534.

The common control information for mobile stations belonging to the second communication system can be transmitted by a base station before a preamble signal of the $(L+1)^{th}$ frame 540 is transmitted. However, it may cause a problem if the BCH area for transmitting the common control information is located before the preamble area 554. For example, if it is assumed that a cell A is operated in the coexistence mode and a cell B adjacent to the cell A is operated in the legacy-only mode, that is, only in the legacy mode, an uplink signal of a mobile station belonging to the cell B may cause interference to reception of a downlink signal by a mobile station belonging to the cell A. Hereinafter, a frame structure used by each of the mobile stations belonging to the cell A and the cell B will be described with reference to FIG. 6.

Figure 6:
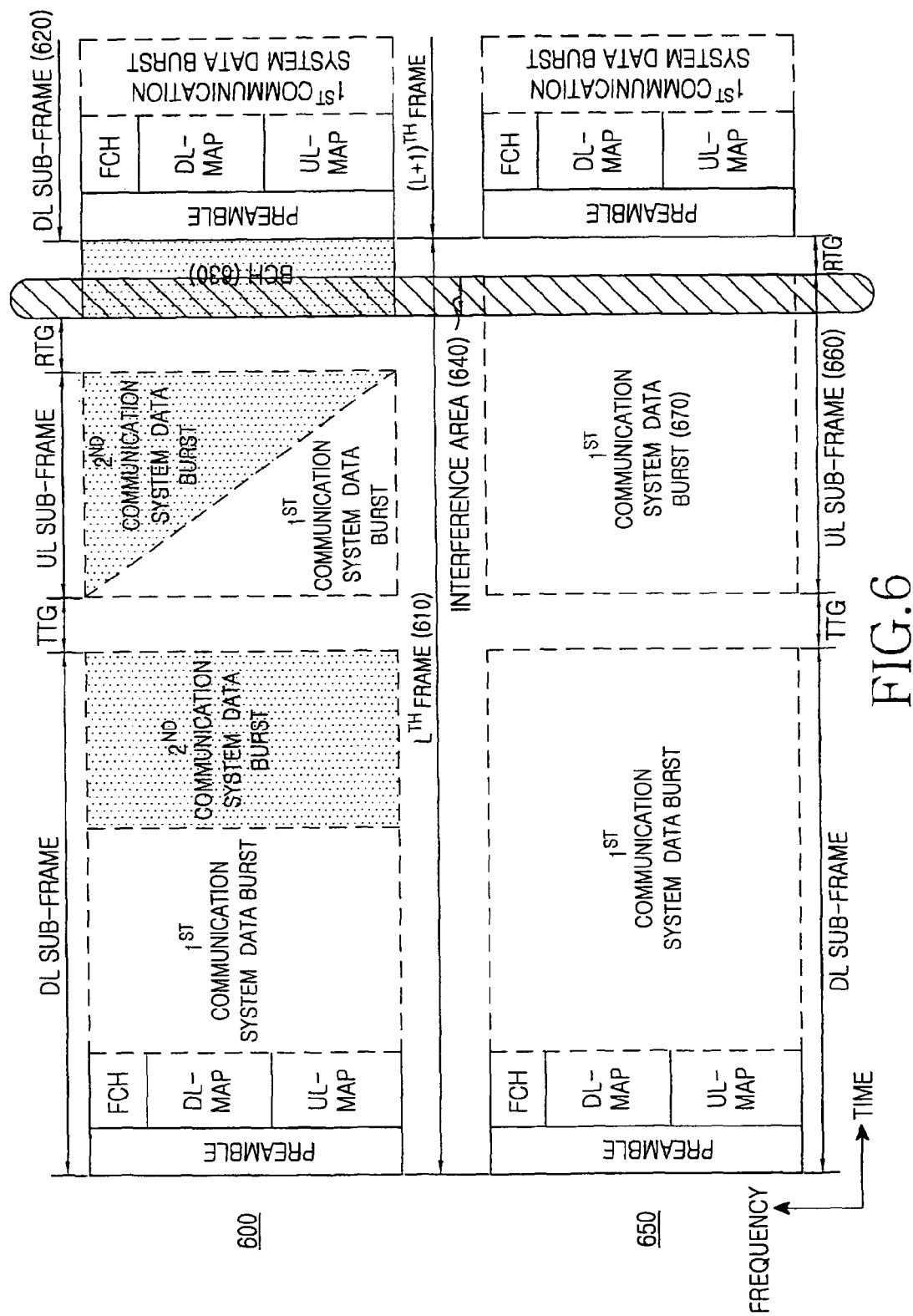
FIG. 6 illustrates frame structures used in the coexistence mode and the legacy-only mode according to an embodiment of the present invention, respectively.

FIG. 6 illustrates frame structures used in the coexistence mode and the legacy-only mode according to an embodiment of the present invention, respectively.

Referring to FIG. 6, the frames 600 correspond to frames used in the coexistence mode, and the frames 650 correspond to frames used in the legacy-only mode. In the following description, a frame used in the coexistence mode is called a coexistence mode frame, and a frame used in the legacy-only mode is called a legacy-only mode frame.

A part of the time interval of the BCH area 630 included in the $L^{th}$ frame 610 from among the coexistence mode frames 600 overlaps with a part of the time interval of the first communication system data burst area 670 included in the uplink sub-frame 660 of the $L^{th}$ frame 610 from among the legacy-only mode frames 650. The overlapping time interval as described above is called an interference area 640.

Therefore, in the interference area 640, an uplink signal of a mobile station belonging to the cell B operated in the legacy-only mode interferes with a downlink signal of a mobile station belonging to the cell A operated in the coexistence mode.

Figure 7:
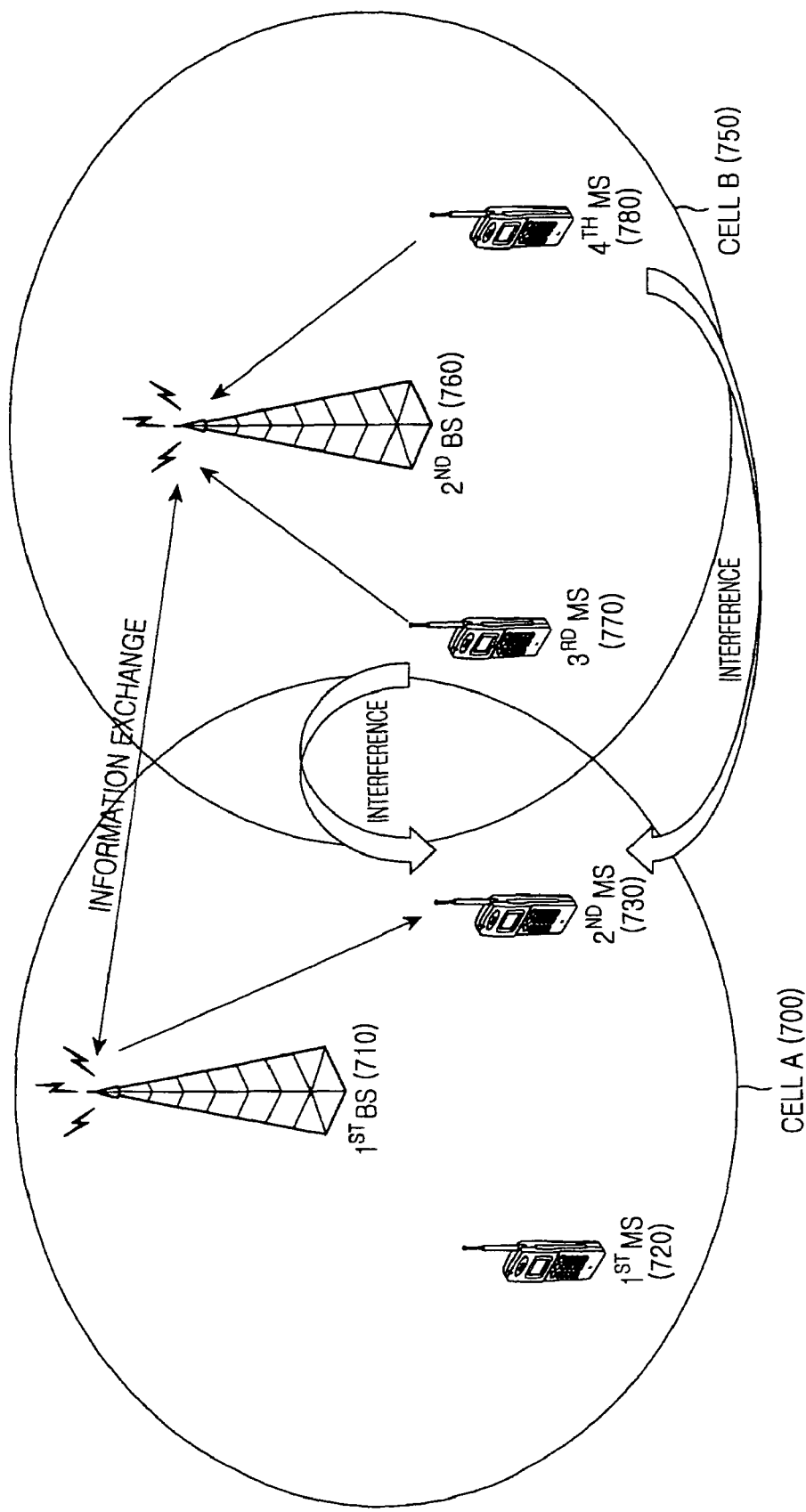
FIG. 7 illustrates interference occurring between mobile stations belonging to a cell operated in the coexistence mode and mobile stations belonging to a cell operated in the legacy-only mode according to an embodiment of the present invention.

FIG. 7 illustrates interference occurring between mobile stations belonging to a cell operated in the coexistence mode and mobile stations belonging to a cell operated in the legacy-only mode according to an embodiment of the present invention.

Referring to FIG. 7, the cell A 700 is operated in the coexistence mode while the cell B 750 is operated in the legacy-only mode. The cell A 700 includes a first base station 710, a first mobile station 720 operated in the legacy-only mode, and a second mobile station 730 operated in the coexistence mode. The cell B 750 includes a second base station 760, a third mobile station 770 operated in the legacy-only mode, and a fourth mobile station 780 operated in the coexistence mode.

Uplink signals transmitted during a particular time interval by the third mobile station 770 and the fourth mobile station 780 interfere with a downlink signal received by the second mobile station 730.

In order to prevent this interference, the first base station 710 allocates corresponding time interval resources of the BCH area of a frame transmitted and received by the second mobile station 730 through communication with the second base station 760 to the mobile stations belonging to the cell B 750 in a limited manner. In other words, the first base station 710 exchanges predetermined information, for example, information on the time interval resource area or information on a frame period including the time interval resource area, with the second base station 760. Then, the second base station 760 does not allocate a resource corresponding to the interference area 640 to the mobile stations.

At this time, the second base station 760 may allocate the resource corresponding to the interference area 640 to a mobile station located at a center of a cell from among the mobile stations within the cell, while it does not allocate the resource corresponding to the interference area 640 to mobile stations located at a cell boundary of the cell. In order to discriminate between a mobile station located at a center of a cell and a mobile station located at a cell boundary of the cell, the second base station 760 may use, for example, either a reception signal intensity or location information such as information provided by a Global Positioning System (GPS). Further, information on the area assigned no resource as described above is delivered to a corresponding mobile station through a UL_Zone_IE message or a PAPR_Reduction_Safety_Sounding_Zone Allocation_IE message.

Figure 8:
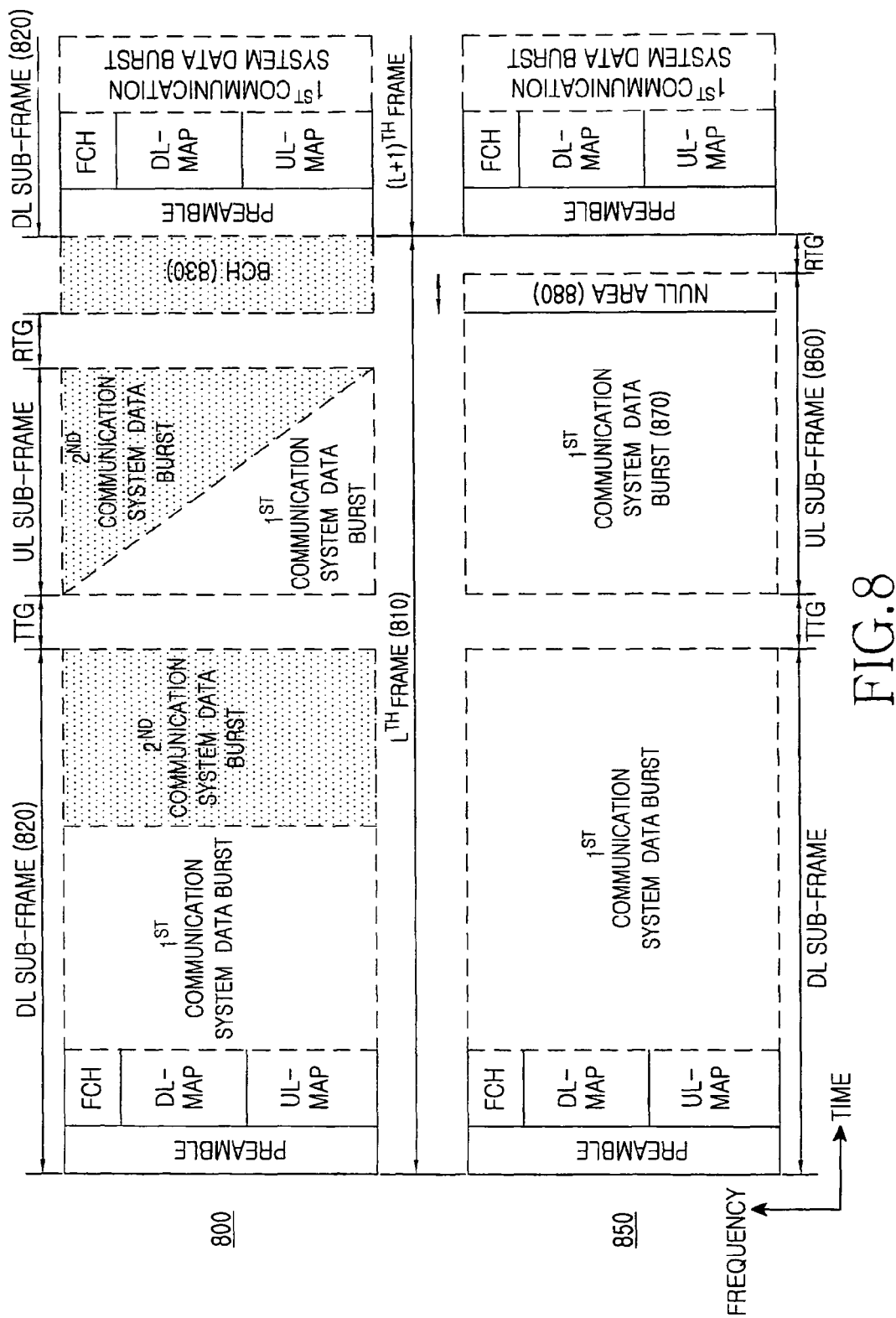
FIG. 8 illustrates frame structures used in the coexistence mode and the legacy-only mode according to an embodiment of the present invention, respectively.

FIG. 8 illustrates frame structures used in the coexistence mode and the legacy-only mode according to an embodiment of the present invention, respectively.

Referring to FIG. 8, the frames 800 correspond to frames used in the coexistence mode, and the frames 850 correspond to frames used in the legacy-only mode. A resource is not allocated to a corresponding time interval of a legacy-only mode frame 850, which overlaps with a time interval of a BCH area 830 included in the $L^{th}$ frame 810 from among the coexistence mode frames 800. Such a time interval is defined as a null area 880.

Meanwhile, a method for preventing a first communication system mobile station from using the second communication system data burst area is required. To this end, the base station reports the second communication system data burst area to the first communication system mobile station by transmitting a MAP_IE message, such as an STC_DL_Zone_Switch_IE message, an AAS_DL_IE message, or a Gap_IE message. Upon receiving at least one message from among the messages described above, the mobile station detects the second communication system data burst area and does not use a resource corresponding to the detected area.

The MAP_IE message includes an indication bit by which the second communication system mobile station can recognize the second communication system data burst area. Therefore, the base station can report the second communication system data burst area to the second communication system mobile station by using a part of the reserved bits within the MAP_IE message.

According to another embodiment of the present invention as described below, the second communication system data burst area is indicated by means of the MAP_IE message, and common control information is transmitted and received through a BCH area located before the second communication system data burst area. Further, when the second communication system data burst area includes a synchronization channel (SCH) area, the common control information is transmitted and received through a BCH area located adjacent to the SCH area.

Figure 9:
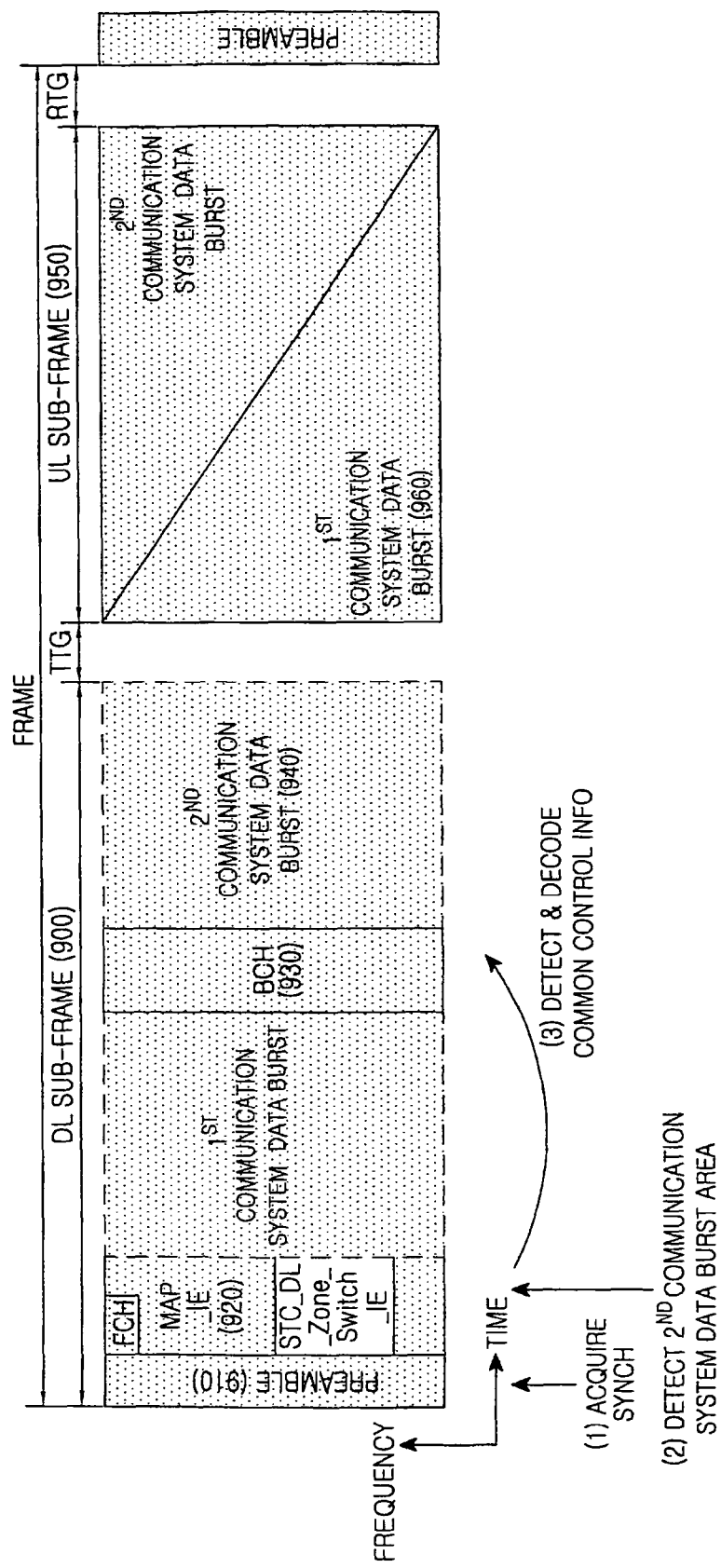
FIG. 9 illustrates a frame structure including a BCH area according to another embodiment of the present invention.

FIG. 9 illustrates a frame structure including a BCH area according to another embodiment of the present invention.

Referring to FIG. 9, the first communication system mobile station and the second communication system mobile station acquire synchronization by receiving a preamble signal transmitted through the preamble area 910, and then detect a second communication system data burst area 940 by receiving an STC_DL_Zone_Switch_IE message transmitted through an STC_DL_Zone_Switch_IE message area or a MAP_IE message transmitted through a MAP_IE area 920.

The first communication system mobile station does not use the resources of the detected second communication system data burst area 940, and uses only the resources of the first communication system data burst area 960 allocated to itself even in the uplink sub-frame 950.

Meanwhile, the second communication system mobile station detects a BCH area 930 included in the second communication system data burst area 940. At this time, the BCH area 930 may be included in each frame of a predetermined period.

According to the present invention as described above, it is possible to provide common control information having a reduced signaling overhead in a communication system having both a legacy-only mode, in which only a legacy communication system exists, and a coexistence mode, in which a legacy communication system and an evolved communication system evolved from the legacy communication system coexist. Further, it is possible to use a channel for transmission of the common control information in the channel estimation.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for transmitting a signal by a base station in a communication system, the method comprising:

transmitting the signal including a common control information using at least two frames to a mobile station, wherein each of the at least two frames includes a downlink sub-frame and an uplink sub-frame, wherein the uplink sub-frame and the downlink sub-frame each include a resource allocation area for a first communication system and a resource allocation area for a second communication system different from the first communication system, and wherein the common control information is transmitted through the resource allocation area for the second communication system included in the downlink sub-frame.

2. The method of claim 1, wherein the first communication system is a Mobile WiMAX communication system, and the second communication system is a Mobile WiMAX evolution communication system.

3. The method of claim 1, wherein each of the uplink sub-frame and the downlink sub-frame is multiplexed by using at least one of a frequency division multiplexing scheme and a time division multiplexing scheme.

4. The method of claim 1, wherein the common control information is transmitted at every frame with a predetermined period.

5. The method of claim 1, wherein the second communication system is an evolved communication system evolved from the first communication system.

6. A method for receiving common control information a signal by a mobile station in a communication system, the method comprising:

receiving, by the mobile station, the signal including a common control information using at least two frames, wherein each of the at least two frames includes a downlink sub-frame and an uplink subframe, wherein the uplink sub-frame and the downlink sub-frame each include a resource allocation area for the first communication system and a resource allocation area for the second communication system different from the first communication system, wherein the common control information is received through the resource allocation area for the second communication system included in the downlink sub-frame.

7. The method of claim 6, wherein the first communication system is a Mobile WiMAX communication system, and the second communication system is a Mobile WiMAX evolution communication system.

8. The method of claim 6, wherein each of the uplink sub-frame and the downlink sub-frame is multiplexed by using at least one of a frequency division multiplexing scheme and a time division multiplexing scheme.

9. The method of claim 6, wherein the common control information is transmitted at every frame with a predetermined period.

10. The method of claim 6, wherein the second communication system is an evolved communication system evolved from the first communication system.

11. A base station capable of transmitting a signal in a communication system, the base station comprising:

a transmitter configured to transmit the signal including a common control information using at least two frames to a mobile station, wherein each of the at least two frames includes a downlink sub-frame and an uplink sub-frame, wherein the uplink sub-frame and the downlink sub-frame each include a resource allocation area for a first common communication system and a resource allocation area for a second common communication system different from the first communication system, and wherein the common control information is transmitted through the resource allocation area for the second communication system included in the downlink sub-frame.

12. The base station of claim 11, wherein the first communication system is a Mobile WiMAX communication system and the second communication system is a Mobile WiMAX evolution communication system.

13. The base station of claim 11, wherein each of the uplink sub-frame and the downlink sub-frame is multiplexed by using at least one of a frequency division multiplexing scheme and a time division multiplexing scheme.

14. The base station of claim 11, wherein the common control information is transmitted at every frame with a predetermined period.

15. The base station of claim 11, wherein the second communication system is an evolved communication system evolved from the first communication system.

16. A mobile station capable of receiving a signal in a communication system, the mobile station comprising:

a receiver configured to receive the signal including a common control information using at least two frames to a mobile station, wherein each of the at least two frames includes a downlink sub-frame and an uplink sub-frame, wherein the uplink sub-frame and the downlink sub-frame each include a resource allocation area for a first common communication system and a resource allocation area for a second common communication system different from the first communication system, and wherein the common control information is received through the resource allocation area for the second communication system included in the downlink sub-frame.

17. The mobile station of claim 16, wherein the first communication system is a Mobile WiMAX communication system and the second communication system is a Mobile WiMAX evolution communication system.

18. The mobile station of claim 16, wherein each of the uplink sub-frame and the downlink sub-frame is multiplexed by using at least one of a frequency division multiplexing scheme and a time division multiplexing scheme.

19. The mobile station of claim 16, wherein the common control information is received at every frame with a predetermined period.

20. The mobile station of claim 16, wherein the second communication system is an evolved communication system evolved from the first communication system.

* * * * *